(12) United States Patent
Flick et al.

(10) Patent No.: US 11,267,370 B2
(45) Date of Patent: Mar. 8, 2022

(54) LONGITUDINAL SEAT ADJUSTER

(71) Applicants: Adient Engineering and IP GmbH, Burscheid (DE); Adient Yanfeng Seating Mechanism Co., Ltd., Shanghai (CN)

(72) Inventors: Joachim Flick, Hückeswagen (DE); Erik Sprenger, Wermelskirchen (DE); Pan Wang, Jiangsu (CN); Peigui Wu, Shanghai (CN)

(73) Assignees: Adient Engineering and IP GmbH, Burscheid (DE); Adient Yanfeng Seating Mechanism Co., Ltd, Shanghai (CN)

( * ) Notice: Subject to any disclaimer, the term of this patent is extended or adjusted under 35 U.S.C. 154(b) by 158 days.

(21) Appl. No.: 16/530,316

(22) Filed: Aug. 2, 2019

(65) Prior Publication Data
US 2020/0039390 A1   Feb. 6, 2020

(30) Foreign Application Priority Data

Aug. 2, 2018 (CN) .......................... 201810870008.1

(51) Int. Cl.
| | | |
|---|---|---|
| *B60N 2/08* | (2006.01) | |
| *B21D 28/02* | (2006.01) | |
| *B21D 53/88* | (2006.01) | |

(52) U.S. Cl.
CPC .......... *B60N 2/0806* (2013.01); *B21D 28/02* (2013.01); *B21D 53/88* (2013.01)

(58) Field of Classification Search
CPC ...... B60N 2/0806; B60N 2/08; B60N 2/0725; B60N 2/0727; B60N 2/04; B60N 2/06;
(Continued)

(56) References Cited

U.S. PATENT DOCUMENTS 4,730,804 A * 3/1988 Higuchi ................. B60N 2/072
248/429
4,813,643 A * 3/1989 Nihei ................... B60N 2/0705
248/393

(Continued)

FOREIGN PATENT DOCUMENTS

| DE | 3042379 A1 | 6/1982 |
|---|---|---|
| DE | 10050957 A1 | 5/2002 |

(Continued)

OTHER PUBLICATIONS

Machine translation of DE3042379.*

*Primary Examiner* — Christopher Garft
(74) *Attorney, Agent, or Firm* — Marshall & Melhorn, LLC

(57) ABSTRACT

A seat length adjuster for a vehicle seat may have two rail pairs, each pair formed by an upper rail and a lower rail. The upper rail is provided with openings and the lower rail has through holes. At least one spring-loaded, movable locking member may be provided. The locking member carries toothlike protrusions on its two opposite lengthwise sides, which are movable from a released position into the locked position both into the openings and into the through holes. The openings and/or the through holes have contact regions for the toothlike protrusions of the locking member and at least some of the toothlike protrusions have a respective undercut on both tooth flanks. In the locked position a projecting edge resulting from this on the respective tooth flank lies opposite the contact region and/or touches this contact region.

9 Claims, 7 Drawing Sheets

(58) Field of Classification Search
CPC ...... B60N 2/07; B60N 2/0812; B60N 2/0818; B60N 2/0825; B60N 2/0881; B60N 2/0837; B60N 2/085; B21D 28/02; B21D 53/88
USPC .......................................................... 242/429
See application file for complete search history.

(56) References Cited

U.S. PATENT DOCUMENTS

| | | | | |
|---|---|---|---|---|
| 5,087,009 A * | 2/1992 | Borlinghaus | ............ | B60N 2/02 248/429 |
| 5,234,189 A * | 8/1993 | Myers | .................... | B60N 2/071 248/429 |
| 6,036,157 A * | 3/2000 | Baroin | .................. | B60N 2/0705 248/429 |
| 6,113,051 A * | 9/2000 | Moradell | ............. | B60N 2/0715 248/430 |
| 6,308,589 B1 * | 10/2001 | Schuler | ................ | B60N 2/0705 248/429 |
| 6,349,914 B1 * | 2/2002 | Yoshida | ................. | B60N 2/071 248/424 |
| 6,648,292 B2 * | 11/2003 | Flick | .................... | B60N 2/0705 248/430 |
| 7,066,521 B2 * | 6/2006 | Jung | .................... | B60N 2/0705 296/65.13 |
| 7,328,877 B2 * | 2/2008 | Yamada | ................ | B60N 2/0705 248/430 |
| 7,658,360 B2 * | 2/2010 | Kojima | ................. | B60N 2/0705 248/429 |
| 8,079,759 B2 * | 12/2011 | Rohee | .................. | B60N 2/0705 384/34 |
| 9,855,867 B2 * | 1/2018 | Satoh | .................... | B60N 2/0837 |
| 2003/0150971 A1 * | 8/2003 | Becker | .................. | B60N 2/0875 248/429 |
| 2004/0108762 A1 * | 6/2004 | Borbe | .................. | B60N 2/0825 297/344.11 |

FOREIGN PATENT DOCUMENTS

| | | |
|---|---|---|
| EP | 0 842 808 A1 | 5/1998 |
| FR | 2 852 896 A1 | 10/2004 |
| WO | 2008/093918 A1 | 8/2008 |

* cited by examiner

LONGITUDINAL SEAT ADJUSTER

The invention relates to a seat length adjuster for a vehicle seat.

Seat length adjusters for adjusting a vehicle seat in the lengthwise direction of a vehicle are generally known. For example, from DE 100 50 957 A1 there is known a seat length adjuster in which a locking member is tiltable and/or rotatable and is secured free of play in its locked position by an angular movement with respect to upper and lower rails.

The problem which the present invention proposes to solve is to indicate a seat length adjuster which locks largely free of play in a locked position and optionally locks securely under a possible mechanical stress.

The problem is solved according to the invention with a seat length adjuster having the features of independent patent claim 1.

Advantageous modifications of the invention are subject matter of the dependent claims.

The seat length adjuster according to the invention, especially for a vehicle seat, comprises
  at least two rail pairs arranged at a distance from each other, formed respectively by two rails, an upper rail and a lower rail, wherein the upper rail is provided with openings, especially slot or window shaped openings, and the lower rail has through holes, especially of tooth or sprocket or crown or U shape, and
  at least one spring-loaded, movable, platelike locking member, which is held movably on the upper rail and which blocks a movement of the upper rail in the lower rail in a locked position and carries toothlike protrusions on its two opposite lengthwise sides, which are movable from a released or unlocked position into the locked position by a spring both into the openings and into the through holes,
wherein the locking member secures the upper rail and lower rail in the locked position, wherein the openings and/or the through holes have at least one contact region for the toothlike protrusions of the locking member and at least some of the toothlike protrusions have a respective undercut on both tooth flanks, wherein in the locked position of the locking member a projecting edge resulting from the undercut on the respective tooth flank of the toothlike protrusions lies opposite the contact region in the opening and/or in the through hole and/or touches it, for example, it lies against this contact region. In this way, the locking member secures the upper rail and lower rail in the locked position largely free of play.

By an undercut of the respective tooth flank of the respective toothlike protrusion is meant in particular a deliberate removal, especially by cutting away, deforming or embossing, of a portion of the tooth flank. A portion of the tooth flank is cut away, deformed, or embossed in such a manner that the toothlike protrusion has, in the vertical section, an upper projecting edge (also a collar or edge section) with a shaft or segment departing from this edge. In other words: the toothlike protrusion has approximately a T shape. The openings and through holes are configured as receiving openings for the toothlike protrusions of the locking member in its locked position.

One aspect provides that the respective opening and/or the respective through hole have inner wall surfaces facing each other and the projecting edges of the two tooth flanks of at least one of the toothlike protrusions in the locked position lie against the inner wall surfaces in the respective contact region without a gap. Alternatively, the projecting edges may lie opposite this contact region with a gap. When no gap is formed, the projecting edges of at least one of the toothlike protrusions lie against the inner wall surfaces especially with force locking, such as friction locking, in the respective contact region or stand in engagement with these inner wall surfaces. This enables a largely noise-free locked position of the locking member.

A further aspect provides that the respective projecting edge and the corresponding contact region are arranged in such a way that, during a movement, especially an unwanted movement, such as a horizontal movement of the upper rail and lower rail relative to each other or of the lower rail and the locking member relative to each other in the lengthwise direction in the locked position of the locking member as a result of a mechanical stress, especially an external mechanical stress, at least one of the projecting edges comes into engagement or into further engagement, especially in form fit, with the inner wall surface in the corresponding contact region. The locking member is securely held and fixed in the locked position by the further engagement of at least one of the projecting edges, for example by form fit with the inner wall surface in the corresponding contact region of the opening or the through hole.

For example, the respective projecting edge and the inner wall surface are arranged in such a way that, during an unwanted horizontal movement of the upper rail relative to the lower rail or a relative movement of the upper rail and lower rail relative to each other or of the lower rail and the locking member in the lengthwise direction respectively in the locked position of the locking member as a result of the mechanical stress, the projecting edge in the corresponding contact region penetrates into this inner wall surface and/or deforms this inner wall surface, especially by plastic deformation. As a result of the engagement of the respective projecting edge with the inner wall surface in the contact region, a deformation, especially a plastic deformation (also known as plasticization) of the inner wall surface may occur. By virtue of such an engagement of the locking member in the lower rail or by such a deformation, a vertical movement of the locking member into its released or unlocked position is largely prevented, so that the vehicle seat is held securely in the adjusted lengthwise position.

For example, the particular projecting edge or the collar or edge enters into a press-fit or spline connection, especially a flat keying, with the corresponding inner wall surface of the opening or the through hole. The inner wall surface may have a straight trend. If the inner wall surface has an inwardly slanting or wedge-shaped trend, for example, the form fit is strengthened accordingly and the fixation of the locking member in the locked position is further secured.

One modification provides that, during an in particular unwanted movement, especially a horizontal movement of the upper and lower rails relative to each other or of the lower rail and the locking member relative to each other in the lengthwise direction in the locked position of the locking member as a result of a mechanical stress, especially an external mechanical stress, such as during an accident, the respective projecting edge and the corresponding contact region are arranged in such a way that the projecting edge deforms the contact region and/or penetrates into it.

This ensures that the locking member securely locks the upper rail and lower rail together, even under a mechanical stress. Conventional locking members with conventional toothlike protrusions without an undercut may slip out from the locked position under heavy mechanical stress and cause an unwanted movement between upper rail and lower rail. In particular, the edge deforms the contact region in such a way and/or penetrates into this contact region in such a way that the upper rail and lower rail remain in the locked position. Thus, an opening of the locking is prevented by means of the edge resulting from the undercut, which penetrates into the flanks of the openings or through holes under stress or deforms these flanks.

In order to support a secure locking even during unwanted heavy mechanical stress, the openings and/or the through holes have slanted or wedge-shaped flanks. For example, the openings or through holes have a substantially V shape or a U shape with slanted flanks. A flank spacing between the flanks of an opening or a through hole in the contact region with the projecting edge is narrower than the flank spacing in the region of the undercut. For example, the toothlike protrusions have a substantially T shape in cross section, in relation to the vehicle in the longitudinal section. The cross arm of the T shape lies against the flanks in the contact region, especially inner wall surfaces, of the openings or through holes and thus in the region of the small flank spacing or gap-free engagement.

In a further embodiment, at least the contact regions of the lower rail and/or the upper rail are formed from a softer material than the material of the locking member and/or the toothlike protrusions. For example, the lower rail and the upper rail are formed from a metal plate, especially a high-strength metal plate, in particular a metal plate with a thickness of for example 1.3 mm to 3 mm, especially 1.4 mm, and/or a strength of >600 N/mm$^2$, and the locking member is formed from a solid metal body, especially a hard or hardened steel body, with a thickness of for example 1.5 mm to 4 mm, especially 2.5 mm, and a strength of >1000 N/mm$^2$.

One possible embodiment provides that all toothlike protrusions on both tooth flanks have an undercut. This enables an especially secure locking of upper rail and lower rail.

A further aspect provides that the undercut is introduced into the toothlike protrusion for example by means of a forming step. In particular, the undercut can be introduced in a pressing tool by means of a cutting gap or in a punching tool or in an embossing tool by means of a punch. The undercut may also be introduced in a cutting press tool by means of an undercut or recess or by means of shaping. This can occur in a forming process with the production of the locking member itself. Alternatively, the undercut can be introduced into the toothlike protrusions in a separate forming step.

Exemplary embodiments of the invention will be explained more closely with the aid of drawings. In the figures:

FIG. 1 schematically shows in lateral representation, an exemplary embodiment of a length adjuster for a seat, FIG. 2 schematically shows in perspective representation, an exemplary embodiment of a length adjuster with two rail pairs arranged at a distance from each other, FIGS. 3A to 3D schematically, show different views of an exemplary embodiment for a rail pair of the length adjuster, FIGS. 4 to 6 schematically, show various cross sectional representations of the rail pair of FIGS. 3C and 3D, FIGS. 7A to 7C each schematically show in a cross sectional representation, a lower rail with adjoining projecting edges in the contact region, resulting from undercuts in toothlike protrusions of a locking member, FIG. 8 schematically shows in cross sectional representation, a through hole in the lower rail with an edge of one of the toothlike protrusions having penetrated into the contact region of the through hole at a side flank after a heavy mechanical stress, and FIG. 9 schematically shows in enlarged cross sectional representation, the through hole in the lower rail with the edge of one of the toothlike protrusions having penetrated into the contact region of the through hole on the side flank after a heavy mechanical stress as compared to the edge prior to the stress.

Mutually corresponding parts are given the same reference numbers in all the figures.

FIG. 1 shows schematically in lateral representation an exemplary embodiment of a seat 1 with a back rest 2 and a seat portion 4. For adjusting the seat 1 in the lengthwise direction X of a vehicle, the seat 1 comprises a length adjuster 3, also called a seat length adjuster 3. To activate the length adjuster 3, the seat 1 comprises an activating element 5, such as an operating bar, which projects to the front from beneath the seat 1 for grasping.

FIG. 2 shows schematically in perspective representation an exemplary embodiment of the length adjuster 3. The length adjuster 3 comprises two rail pairs 10 arranged at a distance from each other, formed respectively by two rails, an upper rail 11 and a lower rail 12.

FIG. 3A shows the rail pair 10 in perspective representation.

FIG. 3B shows the rail pair 10 in partly cut-open view, in order to show details on the inside of the rail pair 10.

Figure 1:
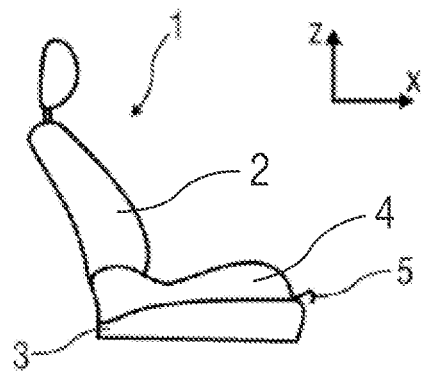
Figure 2:
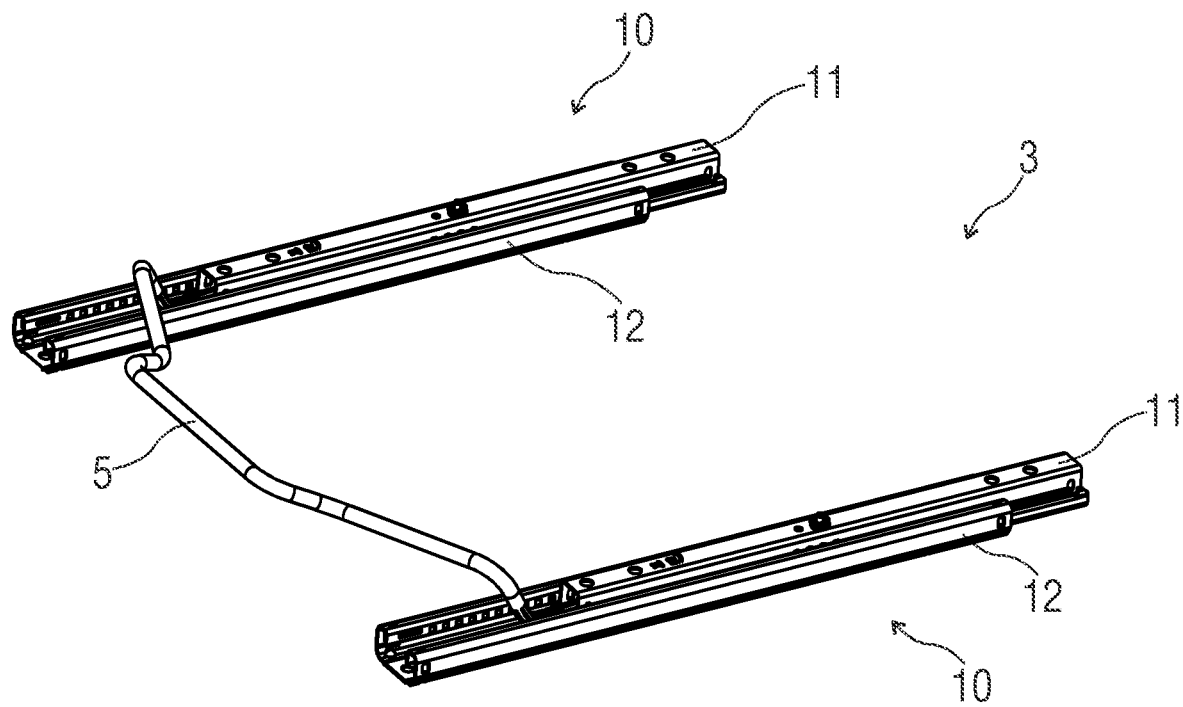

The upper rail 11 is provided with openings 16, especially slotlike openings. The lower rail 12 has through holes 14, which are formed for example like teeth or sprockets.

At least one spring-loaded, movable locking member 21 is held on the upper rail 11. In particular, the at least one spring-loaded locking member 21 is held movably on the upper rail 11, especially vertically movably.

In a locked position VS (shown in FIGS. 3B, 4 to 9) of the locking member 21, this blocks a movement of the upper rail 11 in the lower rail 12 by means of toothlike protrusions 15. The toothlike protrusions 15 are provided on both opposite lengthwise sides of the locking member 21.

The toothlike protrusions 15 are movable from a released position FS (shown in FIG. 4 by dotted line) into the locked position VS by a spring 25 or an elastic element both into the openings 16 and into the through holes 14.

The spring 25 or the elastic element is activated for example by means of the activating element 5. The spring 25 or the elastic element is formed in particular as a leaf spring or an elastic profile element, especially a resilient metal plate, or in another form, such as a trumpet spring.

Figure 3A:
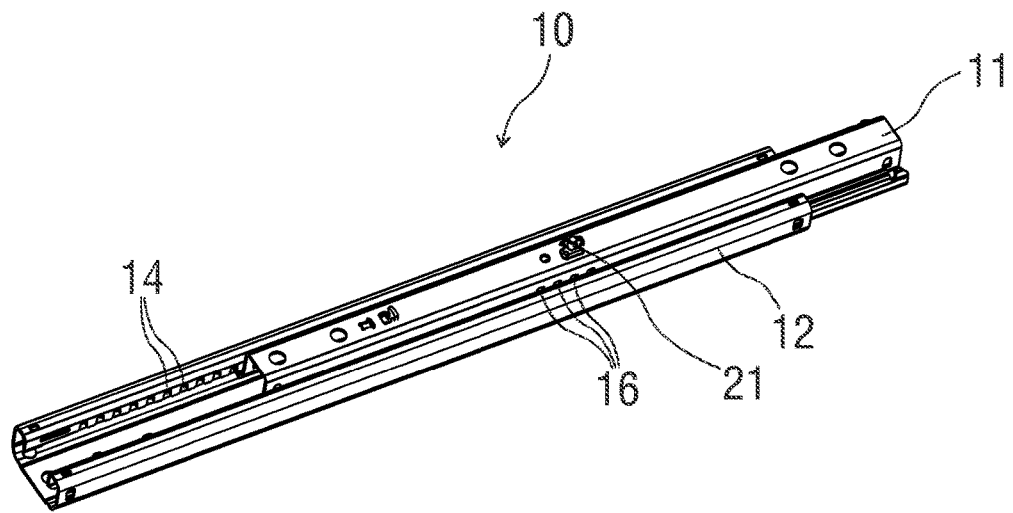
FIGS. 3A to 3D show schematically different views of an exemplary embodiment for a rail pair 10 of the length adjuster 3.
Figure 3B:
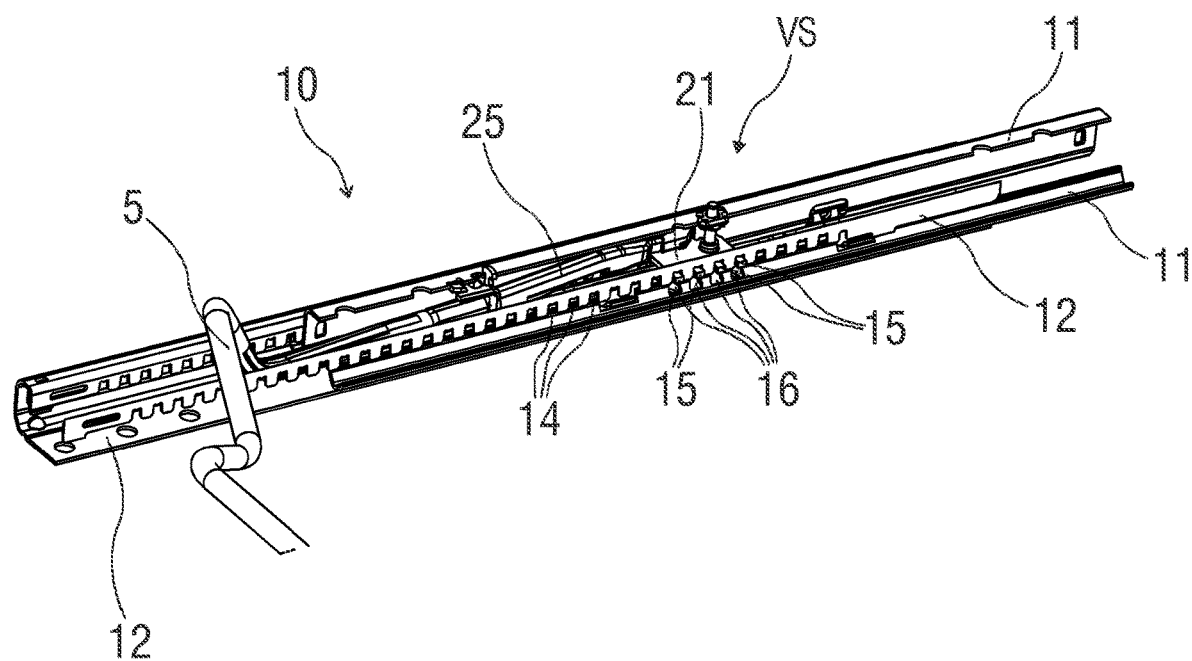
Figure 3C:
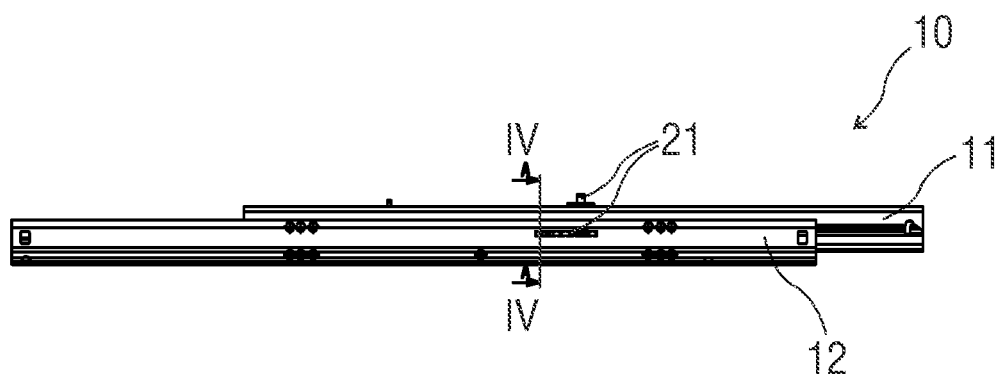
Figure 3D:
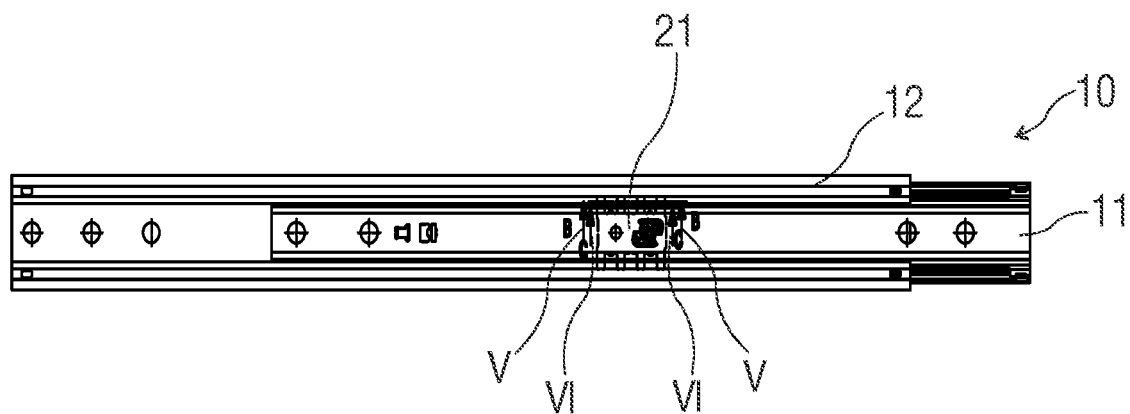

FIG. 3C shows the rail pair 10 in side view and FIG. 3D shows the rail pair 10 in top view looking at the upper rail 11.

Figure 4:
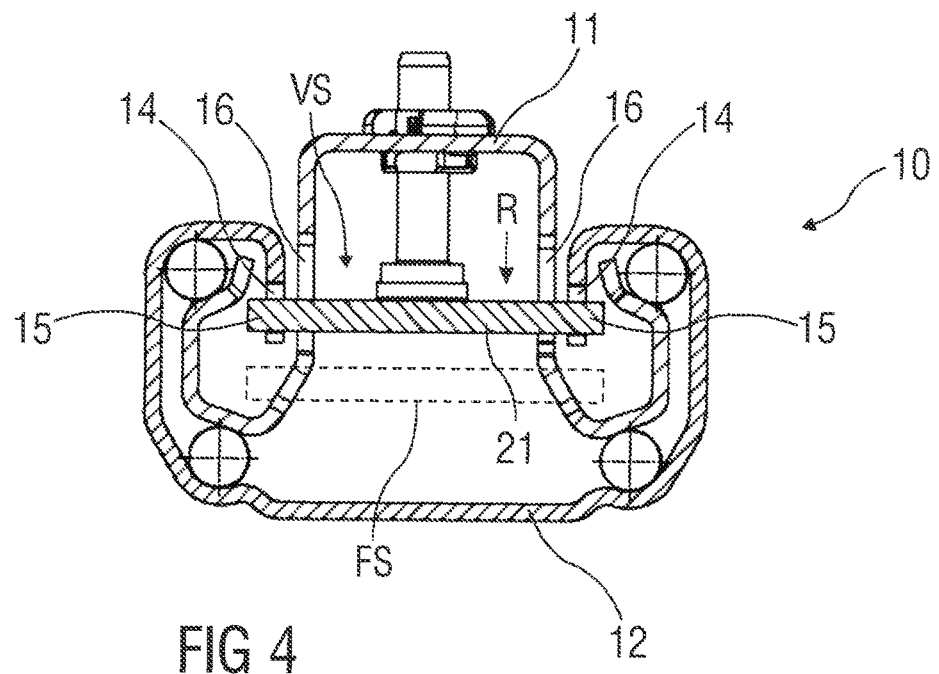
Figure 5:
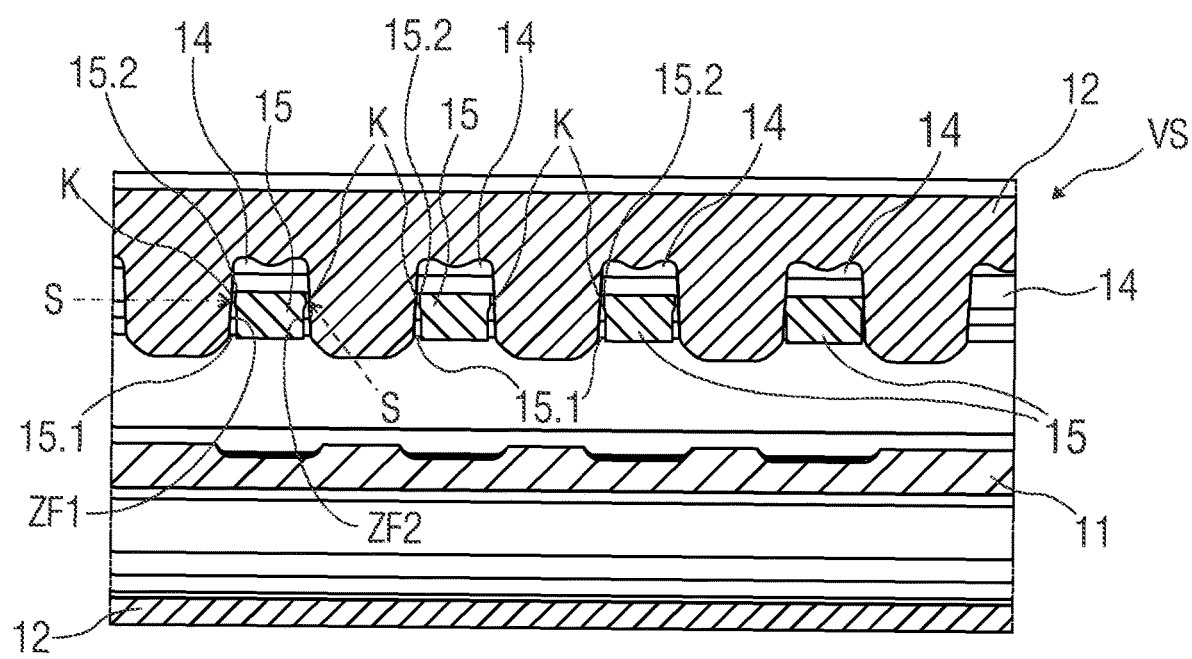
Figure 6:
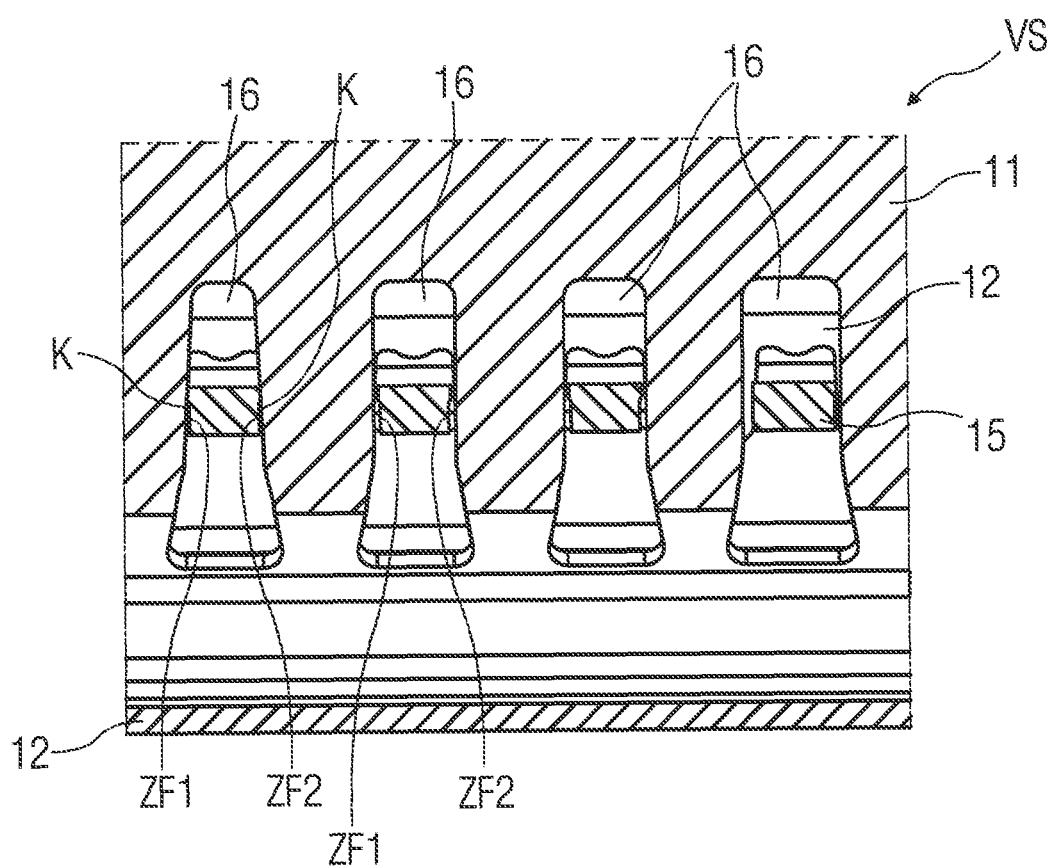

FIGS. 4 to 6 show schematically various cross sectional representations of the rail pair 10 of FIGS. 3C and 3D.

FIG. 4 shows a cross section of FIG. 3C in the region of the locking member 21, which engages by its toothlike protrusions 15 in the openings 16 and through holes 14 in the locked position VS, so that the upper rail 11 and the lower rail 12 are locked together against a displacement.

The locking member 21 carries toothlike protrusions 15 on its two opposite lengthwise sides, which are movable from the released position FS into the locked position VS both into the openings 16 and into the through holes 14. The locking member 21 secures the upper rail 11 and lower rail 12 in the locked position VS.

FIG. 5 shows a longitudinal section of FIG. 3D in the region of the lower rail 12 with the through holes 14, in which the toothlike protrusions 15 of the locking member 21 engage in the locked position VS.

At least some of the toothlike protrusions 15 have a respective undercut 15.1 on their tooth flanks ZF1, ZF2, wherein in the locked position VS of the locking member 21 a projecting edge 15.2 resulting from the undercut 15.1 on the respective tooth flank ZF1, ZF2 lies at least opposite the contact region K in the respective opening 16 or in the through hole 14. The projecting edge 15.2 in the locked position VS may touch this contact region K and thus lie against it without a gap or lie opposite this contact region K at a distance and thus with a gap S.

FIG. 6 shows a longitudinal section of FIG. 3D in the region of the upper rail 11 with the openings 16, especially slotlike openings, in which the toothlike protrusions 15 of the locking member 21 engage in the locked position.

The openings 16 of the upper rail 11 and/or the through holes 14 of the lower rail 12 respectively have at least one contact region K for the toothlike protrusions 15 of the locking member 21 on the respective inner wall surfaces W1, W2.

Figure 7:
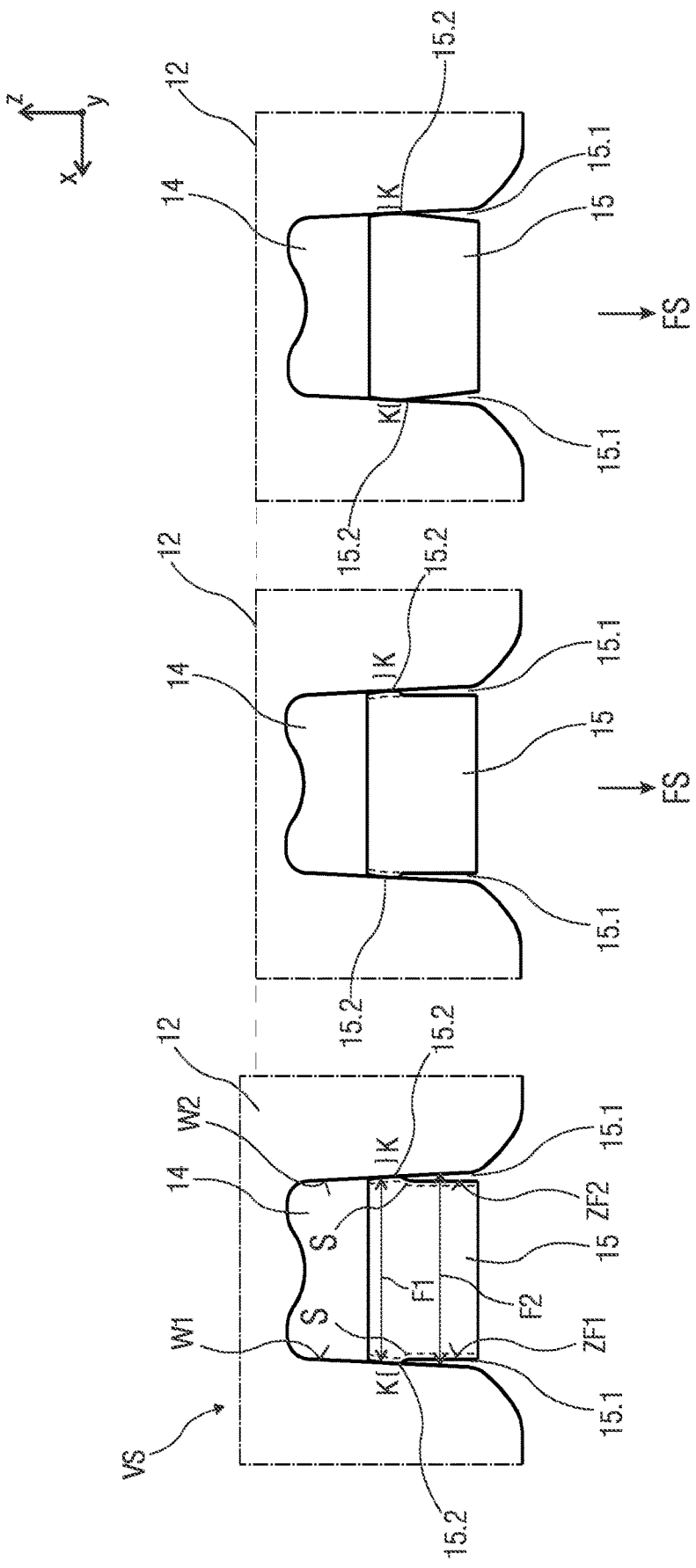

At least some of the toothlike protrusions 15 have the undercut 15.1 on both tooth flanks ZF1, ZF2, which is described more closely in the following FIGS. 7 and 8 on the example of the lower rail 12.

In the locked position VS a projecting edge 15.2 resulting from the undercut 15.1 on the respective tooth flank ZF1, ZF2 of the protrusions 15 lies opposite the contact region K and/or touches this contact region K.

FIGS. 7A to 7C show schematically three sectional representations of the same cut-out of the lower rail 12 with a through hole 14 and a toothlike protrusion 15 engaging therein in the locked position VS of the locking member 21 in different loading states.

In FIG. 7A the projecting edge 15.2 of the protrusion 15 touches the contact region K at the flanks and thus at the inner wall surfaces W1, W2 of the through hole 14. The edge 15.2 lies against the inner wall surfaces W1, W2 largely without a gap. Alternatively, the projecting edge 15.2 may be spaced apart from the inner wall surfaces W1, W2 with a small gap S (shown dotted). The lower rail 12 is shown in the normal loading state.

In FIG. 7B the lower rail 12 is slightly bent or compressed on account of a heavy mechanical stress in the vertical direction Z or in the lengthwise direction X as compared to the state in FIG. 7A, in particular it is pressed in the direction R of the locking member 21 and its protrusion 15. In this way, the projecting edge 15.2 in the contact region K can contact the flanks of the through hole 14 more strongly and deform or engage with the contact region K, as shown in FIG. 7C.

For example, the respective projecting edge 15.2 and the corresponding contact region K are arranged such that, during a movement, especially a horizontal movement of the upper rail 11 and lower rail 12 relative to each other or of the lower rail 12 and the locking member 21 relative to each other in the lengthwise direction X respectively in the locked position VS of the locking member 21 as a result of a mechanical stress, at least one side of the projecting edges 15.2 comes into engagement or into further engagement with the inner wall surface WF1, WF2 in the corresponding contact region K. For example, one of the sides or both sides of the projecting edge 15.2 penetrate into the inner wall surface WF1 and/or WF2 in the corresponding contact region K in such a way that this inner wall surface WF1 and/or WF2 is deformed, especially plastically deformed.

Figure 8:
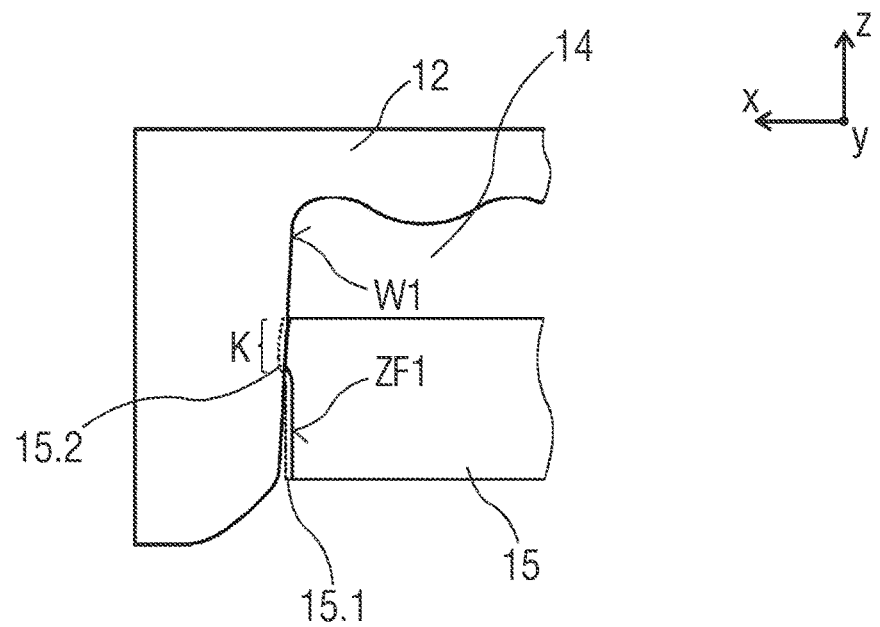

FIG. 8 shows schematically in enlarged cross sectional representation the through hole 14 in the lower rail 12 with the edge 15.2 of the toothlike protrusion 15 having penetrated into the contact region K of the through hole 14 at a side flank after a heavy mechanical stress.

Such a penetration of the edge 15.2 into the contact region K of the lower rail 12 and a resulting deformation, especially a plastic deformation of the inner wall surface WF1 and/or WF2 in the contact region K makes sure that the upper rail 11 and the lower rail 12 remain in the locked position VS. Thus, an opening of the locking is prevented by means of the edge 15.2 resulting from the undercut 15.1, which penetrates into the flanks of the through holes 14 under stress or deforms these flanks.

In order to support a secure locking even under an unwanted heavy mechanical stress, the openings 16 and/or the through holes 14 have slanted or wedge-shaped flanks. For example, the through holes 14 have a substantially U shape with slanted flanks. A flank spacing F1 between the flanks of the through hole 14 in the contact region K with the projecting edge 15.2 is narrower or smaller than the flank spacing F2 in the region of the undercut 15.1, as shown in FIG. 7A.

Furthermore, the toothlike protrusions 15 may have in cross section, in relation to the vehicle in the longitudinal section, a substantially T shape. The cross arm of the T in the contact region K lies against the flanks of the through holes 14 and thus in the area of the smaller flank spacing F1.

In another embodiment, at least the contact regions K of the lower rail 12 and/or the upper rail 11 are formed from a softer material than the material of the locking member 21 and/or the toothlike protrusions 15 of the locking member. For example, the lower rail 12 and the upper rail 11 are formed from a metal plate, especially a high-strength metal plate, in particular a metal plate with a strength of >600 N/mm$^2$, and the locking member 21 is formed from a solid metal body, especially a hardened steel body.

Moreover, only one of the toothlike protrusions 15 or all toothlike protrusions 15 on both tooth flanks can have an undercut 15.1 and a resulting projecting edge 15.2.

Figure 9:
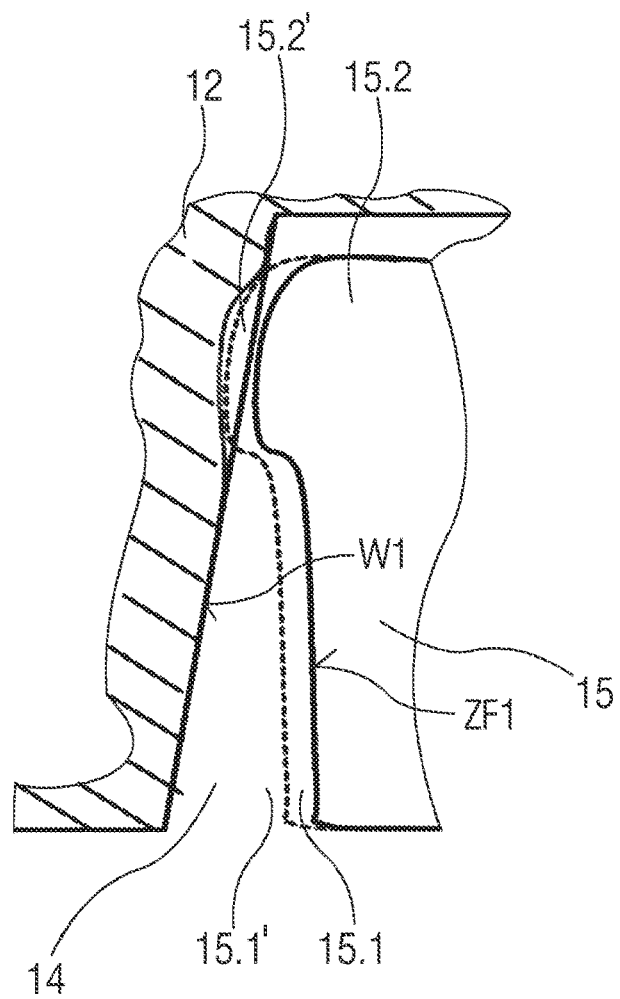

FIG. 9 shows schematically in enlarged cross sectional representation the through hole 14 in the lower rail 12 with the edge 15.2' having penetrated into the contact region K of the through hole 14 on the side flank and the undercut 15.1' of one of the toothlike protrusions 15 after a heavy mechanical stress as compared to the edge 15.2 and the undercut 15.1 prior to the stress.

LIST OF REFERENCE NUMBERS

1 Seat
2 Back rest
3 Seat length adjuster
4 Seat portion
5 Activating element
10 Rail pair
11 Upper rail
12 Lower rail
14 Through hole
15 Toothlike protrusion
15.1, 15.1' Undercut
15.2, 15.2' Edge
16 Opening
21 Locking member
25 Spring
FS Released position K Contact region
F1 Small flank spacing
F2 Large flank spacing
R Direction
S Gap
VS Locked position
W1, W2 Inner wall surface
X Lengthwise direction
Z Vertical direction
ZF1, ZF2 Tooth flanks

The invention claimed is:

1. A seat length adjuster (3), especially for a vehicle seat, comprising at least:
  two rail pairs (10) arranged at a distance from each other, formed respectively by two rails, an upper rail (11) and a lower rail (12),
  wherein the upper rail (11) is provided with openings (16, 16') and the lower rail (12) has through holes (14), and
  at least one spring-loaded, movable locking member (21), which is held on the upper rail (11) and which blocks a movement of the upper rail (11) in the lower rail (12) in a locked position (VS), and which carries toothlike protrusions (15) on its two opposite lengthwise sides, which are movable from a released position (FS) into the locked position (VS) both into the openings (16) and into the through holes (14),
  wherein the locking member (21) secures the upper rail (11) and lower rail (12) in the locked position (VS),
  wherein the openings (16) and/or the through holes (14) have contact regions (K) for the toothlike protrusions (15) of the locking member (21) and at least some of the toothlike protrusions (15) have a respective undercut (15.1) on opposing tooth flanks (ZF1, ZF2),
  wherein in the locked position (VS) of the locking member (21) a projecting edge (15.2) resulting from the undercut (15.1) on the respective tooth flank (ZF1, ZF2) lies opposite the contact region (K) in the respective opening (16) or in the through hole (14) and/or touches this contact region (K),
  wherein the respective opening (16) and/or the respective through hole (14) have slanted inner wall surfaces (WF1, WF2) facing each other, wherein said slanted inner wall surfaces provide a wider bottom entrance for said opening and/or through hole compared with an upper portion of said opening and/or through hole and the projecting edges (15.2) of the two tooth flanks (ZF1, ZF2) of at least one of the toothlike protrusions (15) in the locked position (VS) lie against the upper portion of the inner wall surfaces (WF1, WF2) in the respective contact region (K) without a gap or lie opposite this contact region (K) with a gap (S);
  wherein said undercut provides said at least some of said toothlike protrusions with a T-shape, wherein a vertical bar forming said T-shape is located below a horizontal bar forming said T-shape and wherein said horizontal bar has a wider width than a width of said upper portion of said inner wall surfaces for selective deformation of said inner wall surfaces by said horizontal bar to secure said upper rail to said lower rail.

2. The seat length adjuster (3) as claimed in claim 1, wherein during a horizontal movement of the upper rail (11) and lower rail (12) relative to each other or of the lower rail (12) and the locking member (21) relative to each other in a direction of the horizontal movement (X) respectively in the locked position (VS) of the locking member (21) as a result of a mechanical stress, the projecting edge (15.2) and the contact region (K) are arranged in such a way that the projecting edge (15.2) deforms the contact region (K) and/or penetrates into it.

3. The seat length adjuster (3) as claimed in claim 1, wherein the respective projecting edge (15.2) and the corresponding contact region (K) are arranged in such a way that, during a horizontal movement of the upper rail (11) and lower rail (12) relative to each other or of the lower rail (12) and the locking member (21) relative to each other in the lengthwise direction (X) respectively in the locked position (VS) of the locking member (21) as a result of a mechanical stress, at least one of the projecting edges (15.2) comes into engagement or into further engagement with the inner wall surface (WF1, WF2) in the corresponding contact region (K).

4. The seat length adjuster (3) as claimed in claim 1, wherein the respective projecting edge (15.2) and the inner wall surface (WF1, WF2) are arranged in such a way that, during a horizontal movement of the upper rail (11) and lower rail (12) relative to each other or of the lower rail (12) and the locking member (21) relative to each other in the lengthwise direction (X) respectively in the locked position (VS) of the locking member (21) as a result of a mechanical stress, the projecting edge (15.2) in the corresponding contact region (K) penetrates into this inner wall surface (WF1, WF2) and/or deforms this inner wall surface (WF1, WF2).

5. The seat length adjuster (3) as claimed in claim 4, wherein the projecting edge (15.2) deforms the corresponding contact region (K) in such a way and/or penetrates into this corresponding contact region (K) in such a way that the locking member (21) remains in the locked position (VS) between upper rail (11) and lower rail (12).

6. The seat length adjuster (3) as claimed in claim 1, wherein at least the contact regions (K) of the lower rail (12) and/or the upper rail (11) are formed from a softer material than the material of the locking member (21) and/or the toothlike protrusions (15).

7. The seat length adjuster (3) as claimed in claim 1, wherein all toothlike protrusions (15) on both tooth flanks have an undercut (15.1).

8. The seat length adjuster (3) as claimed in claim 1, wherein the undercut (15.1) is introduced into the respective toothlike protrusion (15) by means of a forming step in a pressing tool by means of a cutting gap or in a punching tool or in an embossing tool by means of a punch or in a cutting press tool or by means of shaping.

9. The seat length adjuster as claimed in claim 1, wherein a material strength of the toothlike protrusion is higher than a material strength of the inner wall surfaces.

* * * * *